(12) United States Patent
Bernath (10) Patent No.: US 11,541,734 B2
(45) Date of Patent: Jan. 3, 2023

(54) SLIDING LATCH MECHANISM

(71) Applicant: Rivian IP Holdings, LLC, Plymouth, MI (US)

(72) Inventor: Thomas Bernath, Huntington Woods, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 17/103,615

(22) Filed: Nov. 24, 2020

(65) Prior Publication Data

US 2022/0161642 A1    May 26, 2022

(51) Int. Cl.
*B60J 7/19*    (2006.01)
*B60J 7/185*    (2006.01)
(Continued)

(52) U.S. Cl.
CPC .............. *B60J 7/194* (2013.01); *B60J 7/11* (2013.01); *E05C 9/046* (2013.01); *E05C 9/20* (2013.01);
(Continued)

(58) Field of Classification Search
CPC ..... B60J 7/11; B60J 7/185; B60J 7/192; B60J 7/194; B60J 7/196; B60J 7/198;
(Continued)

(56) References Cited

U.S. PATENT DOCUMENTS 2,216,012 A * 9/1940 Jacob ................. E05C 9/06
292/45
2,378,119 A * 6/1945 Arthur ................ E05C 9/16
292/7
(Continued)

FOREIGN PATENT DOCUMENTS

DE    1157505 B  * 11/1963  ............ E05C 9/06
EP    0529288 A1 *  3/1993  ............ E05B 13/00
(Continued)

OTHER PUBLICATIONS

Reihl et al., "Roof Arrangement for a Motor Vehicle", Mar. 3, 1993, German Patent Office, Edition: EP0529288A1 (Year: 2993).*
Joachim, "Central Lock for Watertight Doors or Hatch Covers", Nov. 14, 1961, Edition: DE1157505B (Year: 1961).*

*Primary Examiner* — Dennis H Pedder
*Assistant Examiner* — Joyce Eileen Hill
(74) *Attorney, Agent, or Firm* — Haley Guiliano LLP (57) ABSTRACT

A structure, for example a vehicle roof, may define an opening receiving one or more removable panels. The removable panels may each include a panel body configured to cover the opening, and a plurality of latches. The latches may each be positioned adjacent a respective edge of the body and configured to translate between different positions. The removable panel may also include an actuator and a plurality of latch links, with each latch link having a first end connected to a corresponding one of the latches, and each latch link having a second end operably linked with the actuator. Rotation of the actuator may drive each of the latches from an open position of the latch to a closed position, while rotation of the actuator in an opposite direction may drive each of the latches from the closed position of the latch to the open position of the latch.

20 Claims, 8 Drawing Sheets

(51) Int. Cl.
*B60J 7/16* (2006.01)
*B60J 7/11* (2006.01)
*E05C 9/20* (2006.01)
*E05C 9/04* (2006.01)

(52) U.S. Cl.
CPC ............ *B60J 7/1607* (2013.01); *B60J 7/1628* (2013.01); *B60J 7/1635* (2013.01); *B60J 7/185* (2013.01); *B60J 7/1856* (2013.01); *B60J 7/192* (2013.01); *B60J 7/196* (2013.01); *B60J 7/198* (2013.01)

(58) Field of Classification Search
CPC ...... B60J 7/1607; B60J 7/1628; B60J 7/1635; B60J 7/1642; B60J 7/1856; E05C 9/00; E05C 9/06; E05C 9/14; E05C 9/16; E05C 9/20; E05C 9/046; E05C 9/063; E05B 5/00; E05B 5/003; E05B 7/00; Y10T 292/57
USPC ................ 296/218, 223, 224; 292/40, 336.3, 292/DIG. 31; 70/118
See application file for complete search history.

(56) References Cited

U.S. PATENT DOCUMENTS

| | | | | |
|---|---|---|---|---|
| 2,486,586 A | * | 11/1949 | Brittain | E05B 5/003 292/DIG. 31 |
| 2,772,809 A | * | 12/1956 | Ross | B60K 15/0406 220/318 |
| 3,953,061 A | * | 4/1976 | Hansen | E05C 9/042 292/34 |
| 7,237,812 B2 | * | 7/2007 | Tweedy | E05C 9/00 292/DIG. 31 |
| 8,408,623 B1 | * | 4/2013 | McAuliff | B60J 7/11 296/24.33 |
| 10,611,217 B2 | * | 4/2020 | Willard | B60J 7/194 |
| 2006/0279094 A1 | * | 12/2006 | Tweedy | E05C 9/06 292/336.3 |

FOREIGN PATENT DOCUMENTS

| | | | | |
|---|---|---|---|---|
| GB | 2199362 A | * | 7/1988 | ............... E05C 9/06 |
| WO | WO-2021142414 A1 | * | 7/2021 | ............... B60J 10/82 |

* cited by examiner

SLIDING LATCH MECHANISM

INTRODUCTION

The present disclosure is directed to a structure, e.g., a vehicle roof, having one or more removable panels. More particularly, the present disclosure is directed to a latch mechanism for a removable panel to facilitate installation and removal of the panel from the structure.

SUMMARY

Example approaches disclosed herein include a removable panel comprising a panel body configured to cover an opening defined by a structure, and a plurality of latches. The latches may each be positioned adjacent a respective edge of the body and configured to translate from an open position to a closed position. The removable panel may also include an actuator fixed to the panel for rotation about an actuator axis. The removable panel may further include a plurality of latch links, with each latch link having a first end connected to a corresponding one of the latches, and each latch link having a second end operably linked with the actuator such that rotation of the actuator simultaneously drives each of the latch links. Rotation of the actuator in a first rotational direction may drive each of the latches from the open position of the latch to the closed position of the latch, while rotation of the actuator in a second rotational direction opposite the first rotational direction may drive each of the latches from the closed position of the latch to the open position of the latch.

Other examples are directed to a removable vehicle roof panel comprising a panel body configured to cover a roof opening defined by a vehicle structure, and a plurality of latches. The latches may each be positioned adjacent a respective edge of the body and configured to translate from an open position to a closed position. The latches may be configured to engage one of the structure or an adjacent removable panel in the closed position, thereby securing the panel body to the structure. The latches may be contained within an outer installation periphery of the panel body in the open position, such that the panel body is removable from the structure. The removable panel may also include an actuator fixed to the panel for rotation about an actuator axis. The removable panel may further include a plurality of latch links, with each latch link having a first end connected to a corresponding one of the latches, and each latch link having a second end operably linked with the actuator such that rotation of the actuator simultaneously drives each of the latch links. Rotation of the actuator in a first rotational direction may drive each of the latches from the open position of the latch to the closed position of the latch, while rotation of the actuator in a second rotational direction opposite the first rotational direction may drive each of the latches from the closed position of the latch to the open position of the latch.

Other example approaches are directed to a vehicle roof assembly comprising a roof structure defining an opening, and one or more removable panels configured to be selectively removed from the opening. Each of the removable panels may include a panel body configured to the opening, and a plurality of latches. The latches may each be positioned adjacent a respective edge of the body and configured to translate from an open position to a closed position, with the latches configured to engage one of the structure or another one of the removable panels in the closed position, thereby securing the panel body to the structure. The latches may be contained within an outer installation periphery of the panel body in the open position, such that the panel body is removable from the structure. The panels may each further include an actuator fixed to the panel for rotation about an actuator axis, and a plurality of latch links. Each of the latch links may include a rigid member having a first end connected to a corresponding one of the latches, with each latch link having a second end operably linked with the actuator such that rotation of the actuator simultaneously drives each of the latch links. Rotation of the actuator in a first rotational direction may drive each of the latches from the open position of the latch to the closed position of the latch, while rotation of the actuator in a second rotational direction opposite the first rotational direction may drive each of the latches from the closed position of the latch to the open position of the latch.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Some vehicles may allow for removal or temporary stowage of the roof of the vehicle, or a portion of the roof. In some examples of such vehicles, a removable fixed top or panel can be secured to a vehicle structure to enclose the passenger compartment from the external environment, and can also be selectively removed when vehicle occupants desire a more open-air driving experience. Properly securing the panel/roof to the vehicle and sealing the passenger compartment from the external environment may necessitate a less convenient removal/installation of the panel. For example, to the extent a removable panel or roof is securely installed to a vehicle, it may be difficult to remove, require multiple attachments to the vehicle, or require the use of tools. Each of these factors can make removal and installation less convenient and/or more time-consuming. Accordingly, example illustrations herein are directed to a removable panel, e.g., for a vehicle roof or other fixed structure, that facilitates a relatively quick removal and/or installation, while being securely connected to adjacent structure.

An example panel may include a body or other fixed structural member that covers an opening in a structure, such as a vehicle roof. The panel may include multiple latches positioned adjacent one or more edges of the panel body. Each latch may be configured to move, e.g., by translating or sliding, between a first position and a second position. The latch may engage an adjacent structure in the first position such that the latch is closed, while the latch may be positioned generally within the body (or otherwise such that it does not interfere with removal of the panel from the adjacent structure) in the second position, such that the latch is open. In some examples, the latch may extend away from the panel body to engage an adjacent structure or an adjacent panel in the first/closed position, with the latch being relatively withdrawn with respect to the panel body when the latch is in the second/open position. Accordingly, in some examples a first or closed position of the latch may be an extended position of the latch, while a second or open position of the latch may be a withdrawn position of the latch.

Example latches described herein may generally translate or slide between the open and closed positions. In some example approaches, latches may employ translational motion exclusively, i.e., such that the latch does not rotate as the latch moves between the positions. It should be noted, however, that other example latches may incorporate rotational motion as the latch moves between positions, either as an alternative or in addition to translational motion.

An actuator on the panel may be fixed to the panel to allow rotation about a fixed axis, and configured to effect movement of multiple latches by way of latch links connecting the actuator to the latches. Accordingly, the actuator may effect movement of the multiple latches via rotation of the actuator. More specifically, when rotated in a first direction the actuator simultaneously drives each of the latches from the open, disengaged, and/or withdrawn position of the latch to the closed, engaged, and/or extended position of the latch, respectively. Moreover, rotation of the actuator in a second direction opposite the first direction may drive each of the latches from the closed, engaged, and/or extended position of the latch to the open, disengaged, and/or withdrawn position of the latch, respectively.

Figure 1A:
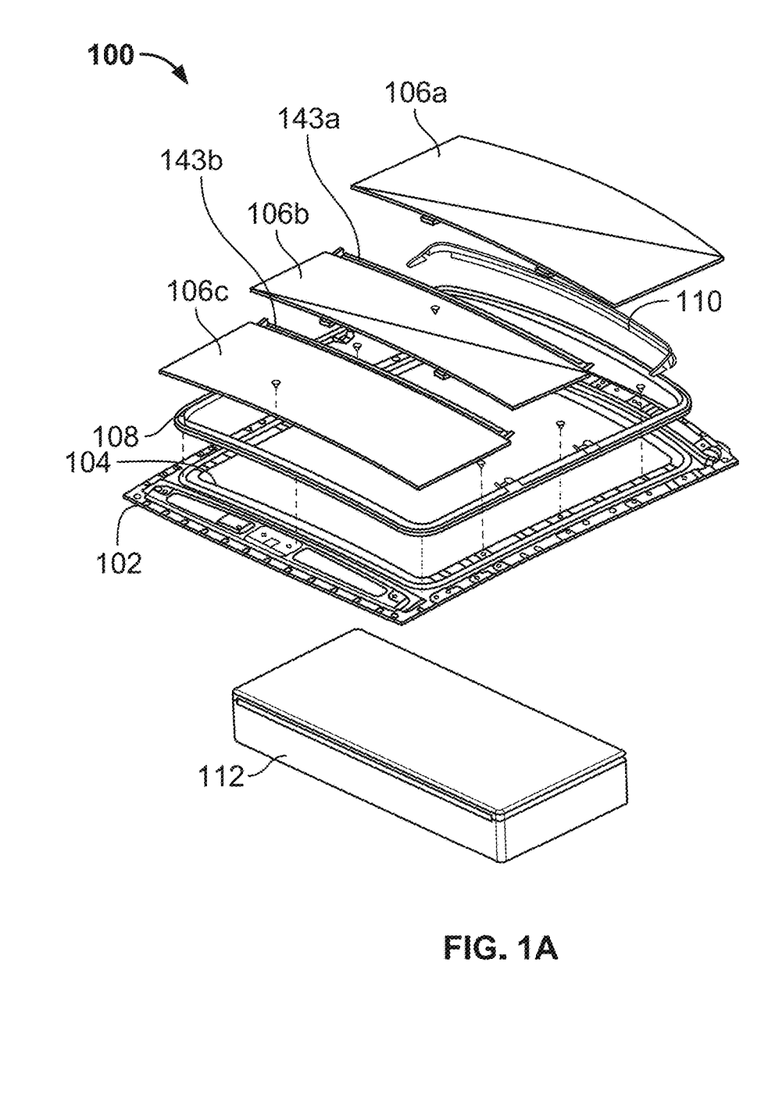
FIG. 1A shows an exploded view of a roof system for a vehicle, in accordance with one example illustration.
Figure 1B:
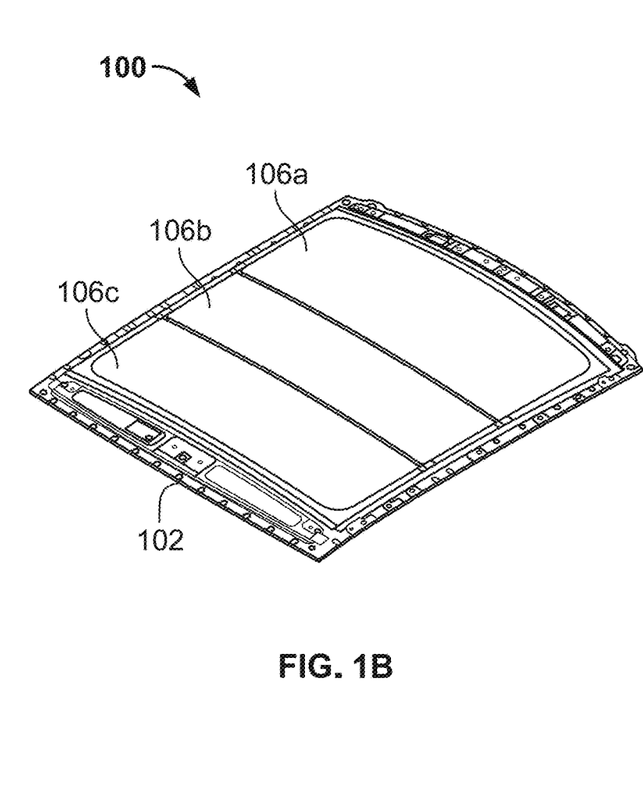
FIG. 1B shows an upper perspective view of the roof system of FIG. 1A, in accordance with an example.

Turning now to FIGS. 1A-1D, an example vehicle roof assembly 100 is illustrated. The roof assembly 100 may generally be a portion of an upper vehicle structure or greenhouse area of a vehicle (not shown). As best seen in FIGS. 1A and 1B, the roof assembly 100 includes a vehicle roof structure 102 defining a fixed opening 104. The roof structure 102 may be permanently affixed to a vehicle (not shown) in any manner convenient, e.g., along upper ends of pillar structures extending from a vehicle lower body. The opening 104 may generally provide access to an external environment around the vehicle from an interior or passenger compartment.

One or more removable panels 106a, 106b, 106c (collectively, 106) may be secured to the vehicle structure 102 to selectively close the opening 104. A seal 108 may be affixed to the structure 102 about the opening 104. The seal 108 may include a resilient material, e.g., weatherstripping or the like, that facilitates a water and/or air-tight seal of the opening 104 when the panels 106 are installed to close the opening 104. For example, the panels 106 may each engage the seal 108 or the seal 108 may otherwise become compressed between the panel 108 and another structure, e.g., structure 102. The panels 106 may be removable from the roof structure 102, allowing the passenger compartment to be opened up, e.g., during driving or other vehicle operation. As will be discussed further below, the panels 106 may be secured to the vehicle roof assembly 102 and/or removed from the vehicle in a defined order. The roof assembly 100 may have a wind deflector 110, which may generally divert airflow over the vehicle when in motion, thereby reducing ambient noise in the passenger compartment. The wind deflector 110 may be moveable, e.g., between a raised position (where the wind deflector 110 protrudes above a roofline of the vehicle to divert airflow in this manner) and a lowered position. The wind deflector 110 may be placed in the lowered position when the panels 106 are secured to the roof structure 102. A panel storage compartment 112 may also be provided, which may allow temporary storage of the panels 106 upon removal from the roof structure 102. The panel compartment 112 may itself be stowed elsewhere in the vehicle during non-use and/or when the panels 106 are stored in the panel compartment 112.

Figure 1C:
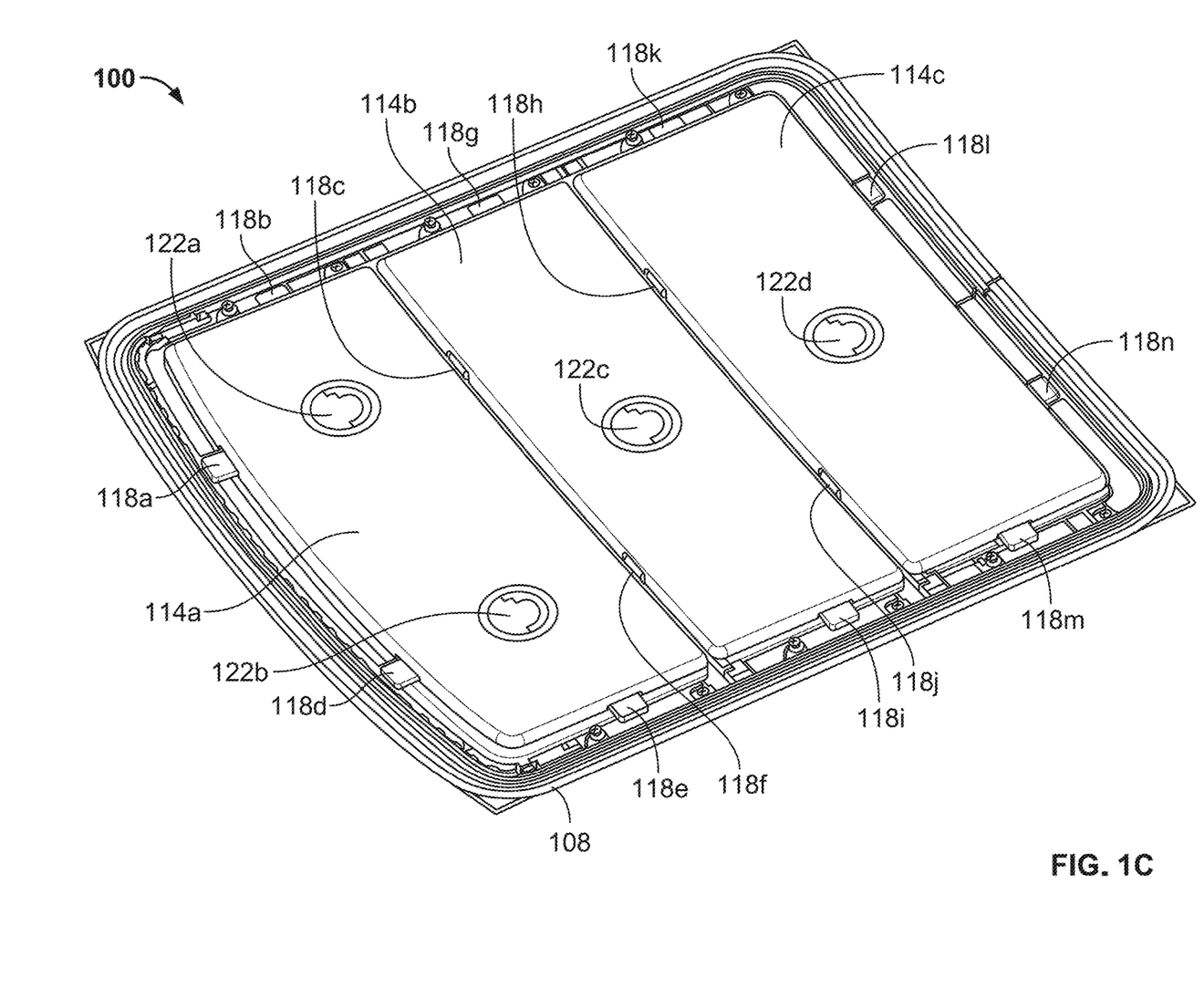
FIG. 1C shows a lower/interior perspective view of the roof system of FIGS. 1A-1B, in accordance with one example approach.
Figure 1D:
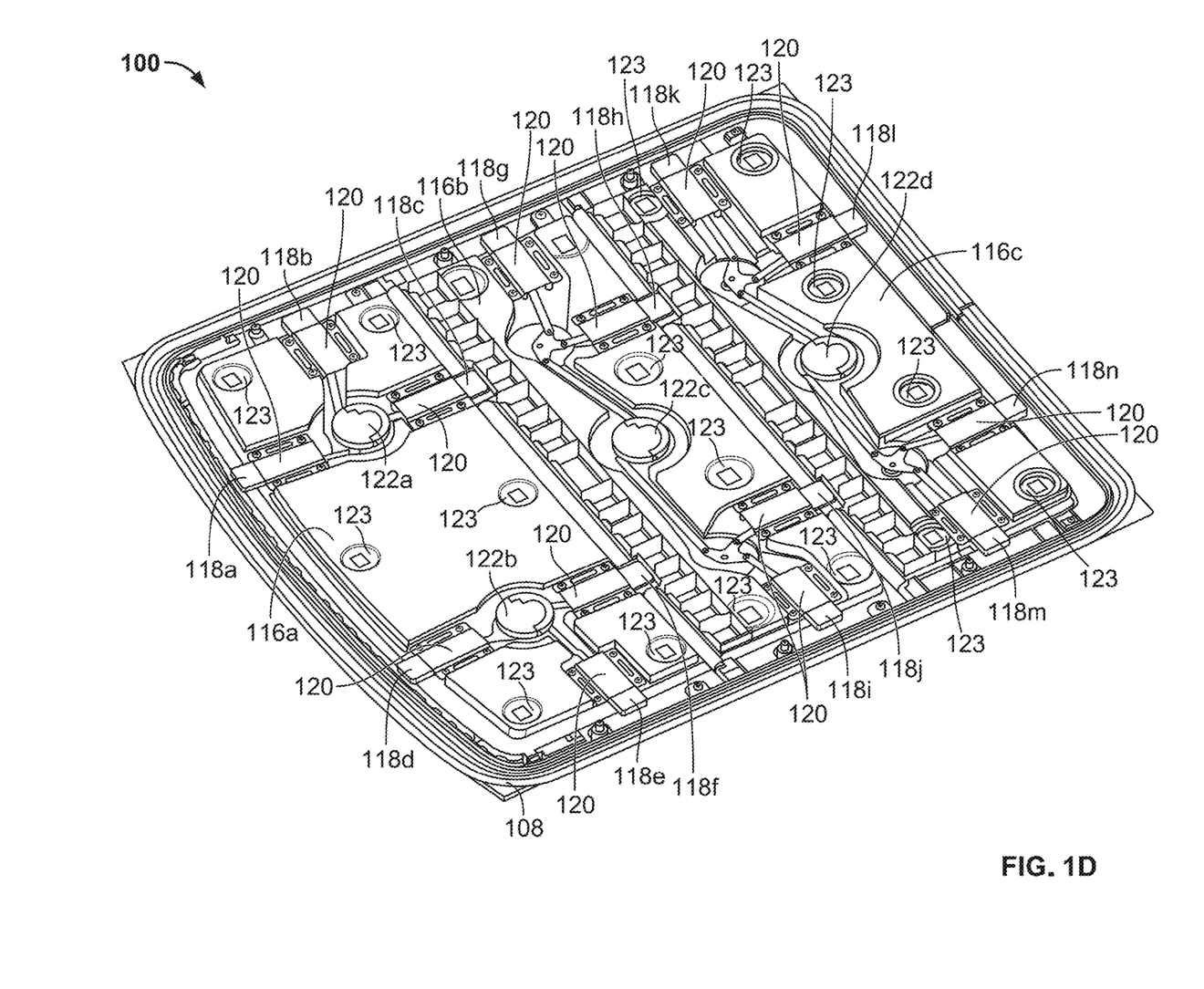
FIG. 1D shows a lower/interior perspective view of the roof system of FIGS. 1A-1C with an interior headliner removed, according to an example.

Turning now to FIGS. 1C and 1D, the vehicle roof assembly 100 is illustrated in further detail. The panels 106 collectively may cover the opening 104 defined by the roof structure 102. As best seen in FIG. 1C, each panel 106 comprises an interior portion or headliner 114a, b, c (collectively, 114), respectively, which defines an interior surface of the panels 106 within the vehicle passenger compartment. As seen in FIG. 1D, the headliner portions 114 (which are removed from FIG. 1D to reveal the underlying structure of each of the panels 106) generally conceal a body 116a, 116b, and 116c (collectively, 116) of the panels 106a, 106b, and 106c, respectively.

With continuing reference to FIGS. 1C and 1D, each of the panels 106 have a plurality of latches 118 for engaging the panels 106 to the vehicle structure 102 or to an adjacent one of the panels 106. Each of the latches 118 are positioned adjacent a respective edge of the body 116 and/or panel 106 to which the latch 118 is mounted. The latches 118 may be mounted within respective sleeves 120, and may be configured to translate or slide within the sleeve 120 between a withdrawn/disengaged/open position and an extended/engaged/closed position. In the closed position, the latches 118 may generally extend beyond a perimeter or boundary of the associated panel 106 to engage either the vehicle structure 102 or an adjacent removable panel 106, thereby securing the panel 106 and/or body 116 to the structure 102. In the open position, the latches 118 may generally be drawn within the perimeter of the panel 106 and/or body 116, allowing the panel 106 to be lifted vertically from the vehicle structure 102.

Figure 3:
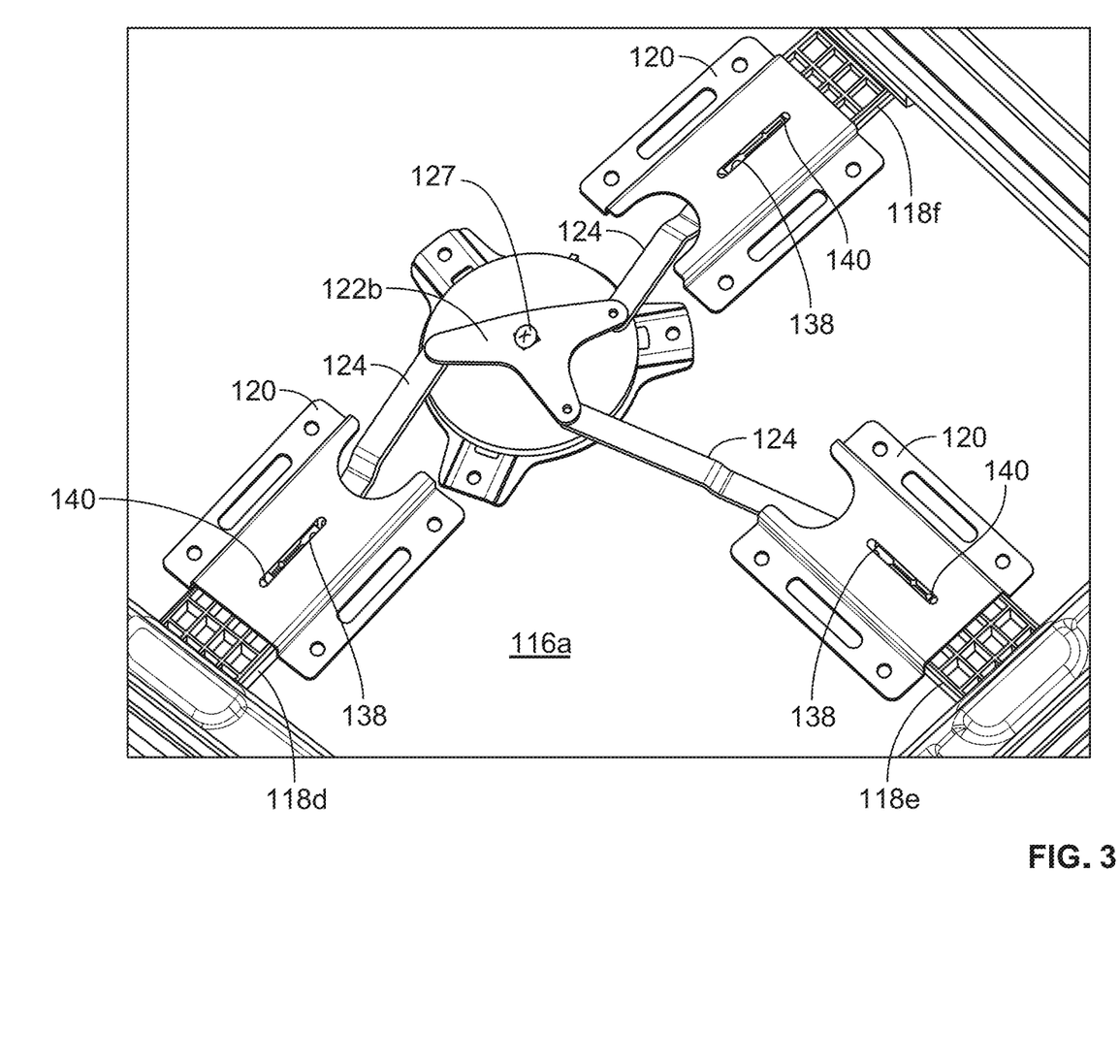
FIG. 3 shows an enlarged lower/interior perspective view of a portion of the roof system of FIGS. 1A-2C, in accordance with an example.

The panels 106 each have one or more actuators 122a, 122b, 122c, 122d (collectively, 122), each of which effectuates movement of a plurality of latches 118. More specifically, the actuators 122 each are fixed to their respective panel 106, and may be rotated, e.g., about an axis that is generally perpendicular to the respective panel 106 and/or body 116. For example, the actuators 122 may be secured to their respective panels 106 with a threaded fastener. Merely by way of example, actuator 122b is illustrated in FIG. 3 as being secured to its panel body 116a with a bolt 127.

Referring again to FIGS. 1C and 1D, the actuators 122 may be either directly or indirectly linked with the latches 118 to convert rotational motion of the actuator 122 to a sliding or translational movement of multiple latches 118 simultaneously. Rotation of an actuator 122 in a first rotational direction generally drives each of the latches 118 from the withdrawn position of the latch to the extended position of the latch, while rotation of the actuator 122 in a second rotational direction opposite the first rotational direction drives each of the latches 118 from the extended position of the latch 118 to the withdrawn position of the latch 118.

As best seen in FIG. 1D, the panel 106a includes two actuators 122a, 122b for initiating sliding movement of the six latches 118a, 118b, 118c, 119d, 118e, and 118f mounted on the panel 106a. More specifically, actuator 122a may be rotated to initiate movement of the latches 118a, 118b, and 188c, while actuator 122b may be rotated to initiate movement of the latches 118d, 118e, and 118f. The latches 118a, 118b, 118d, and 118e each engage the vehicle structure 102 adjacent a forward (in vehicle) or lateral edge of the panel 106a, while the latches 118c, 118f each engage the panel 106b that is adjacent a rearward edge of the panel 106a. The panel 106b includes a single actuator 122c for initiating sliding movement of four latches 118g, 118h, 118i, and 118j. The latches 118g and 118i each engage the vehicle structure 102 adjacent a lateral edge of the panel 106b, while the latches 118h and 118j each engage the panel 106c that is adjacent the rearward edge of the panel 106b. The panel 106c also includes a single actuator 122d for initiating sliding movement of four latches 118k, 118l, 118m, and 118n. The latches 118k and 118m each engage the vehicle structure 102 adjacent a lateral edge of the panel 106c, while the latches 118l and 118n each engage the vehicle structure 102 adjacent a rearward edge of the panel 106c.

Figure 2A:
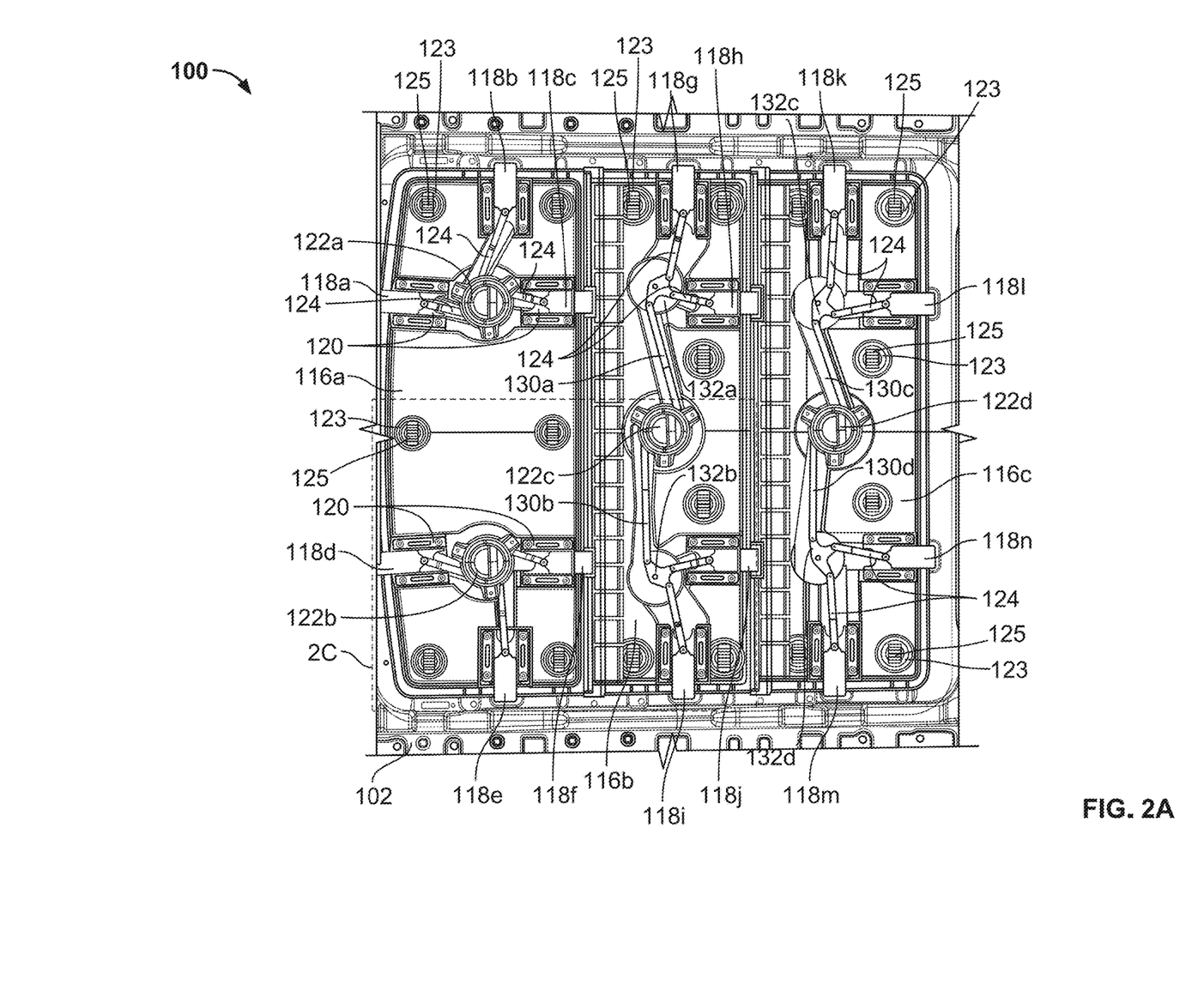
FIG. 2A shows a lower/interior plan view of the roof system of FIGS. 1A-1D with the latches in a first position, in accordance with an example illustration.

The headliners 114 may be secured to the panels 106 in any manner that is convenient. In one example approach, the panels 106 define a plurality of attachment cavities 123, as best seen in FIG. 1D. The attachment cavities 123 may receive a fastener or, for that matter, any other device for securing the headliners 114 to the panels 106. Merely by way of example, as seen in FIG. 2A, the attachment cavities 123 each receive a hook-and-loop style fastener 125. The fastener 125 may engage a corresponding hook-and-loop fastener (not shown) on an underside of the headliners 114, thereby affixing the headliners 114 to their respective panels 106 as seen in FIG. 1C.

Figure 2B:
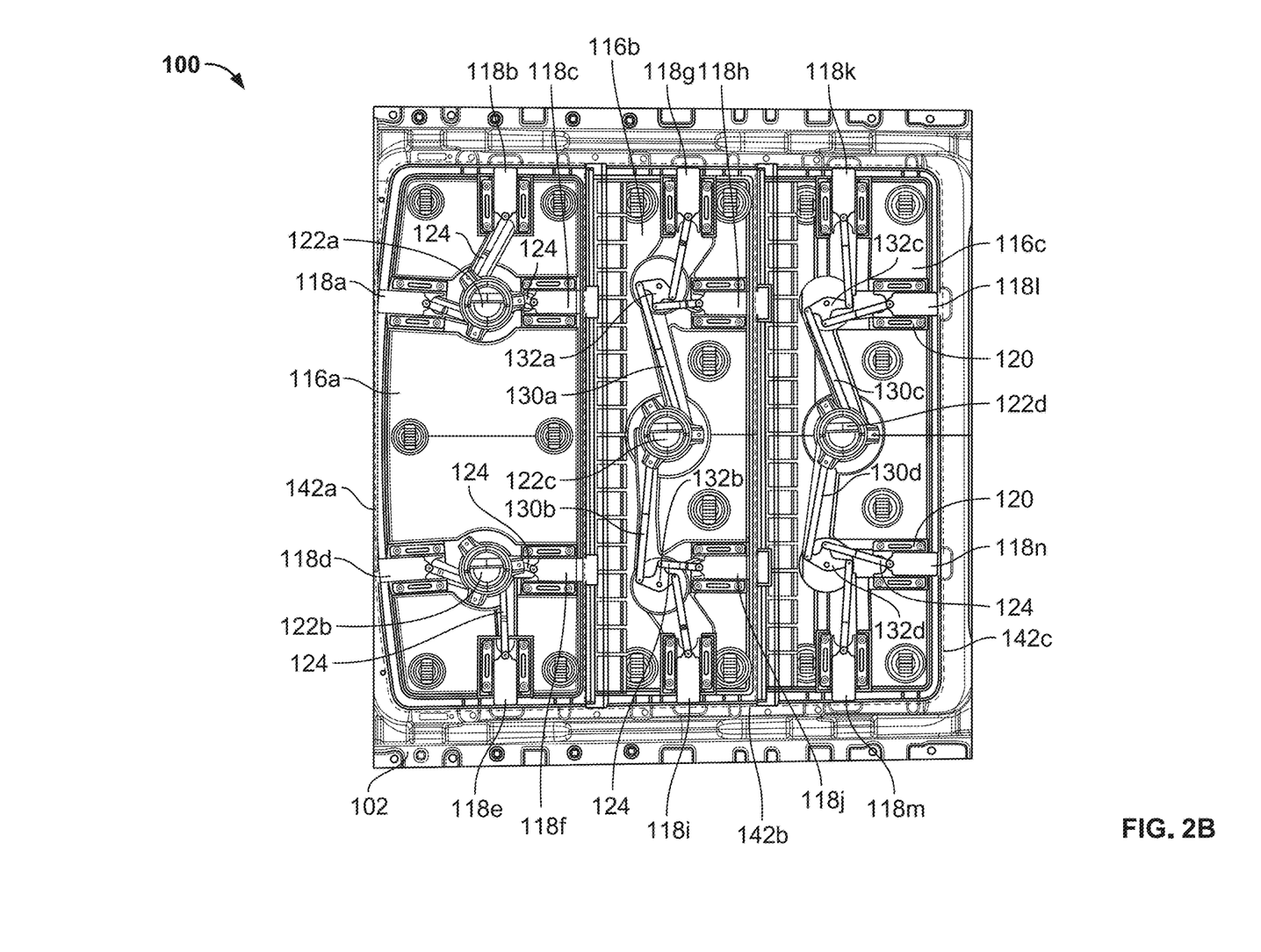
FIG. 2B shows a lower/interior plan view of the roof system of FIGS. 1A-1D with the latches in a second position, according to an example.
Figure 2C:
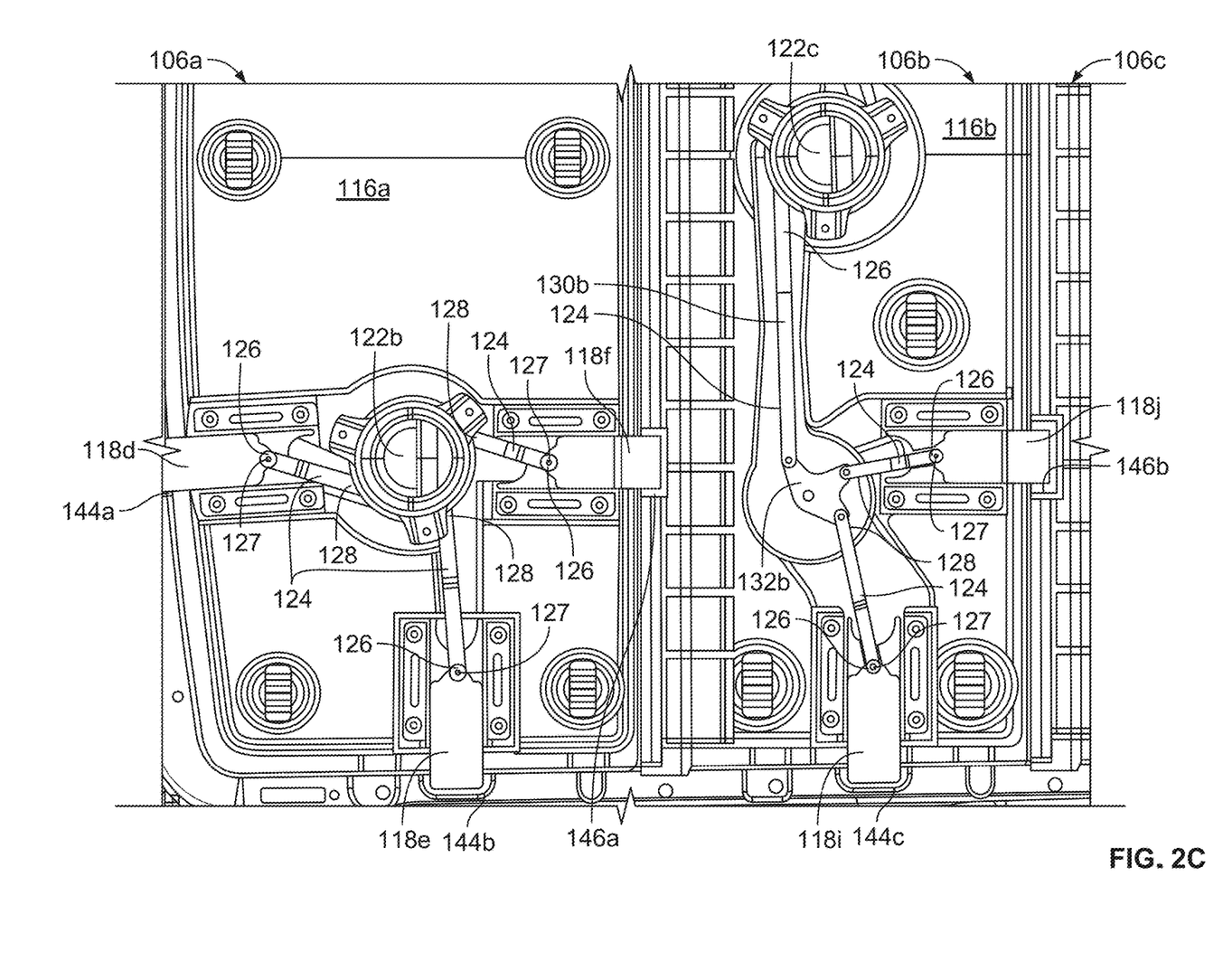
FIG. 2C shows an enlarged portion of FIG. 2A, according to one example illustration.

Referring now to FIGS. 2A-2C, movement of the latches 118 by the actuators 122 will be described in further detail. The actuators 122 may be manipulated by hand, e.g., a driver or passenger of the vehicle, and thus can facilitate installation or removal of the panels 106 without additional tools. To this end, the actuators 122 may have a handle, grip, lever, or any other feature to allow a user to grasp and turn the actuator 122. The latches 118 are illustrated in FIG. 2A in their respective extended/engaged positions, while in FIG. 2B the latches 118 are illustrated in their respective withdrawn/disengaged positions. With the latches 118 in the extended positions, the actuators 122 may be in a first rotational or "home" position, as illustrated in FIG. 2A, where handles or other hand are each aligned in a same direction. The actuators 122 may be rotated to enact movement of the latches 118 to their respective withdrawn/disengaged positions—for example, as illustrated in FIG. 2B, each actuator 122 is rotated approximately 90 degrees counter-clockwise to move the latches 118 to their withdrawn positions.

The actuators 122 are each operatively connected to their respective latches 118 by way of a plurality of latch links 124, with a single latch link 124 corresponding to each of the latches 118. The latch links 124 may be generally rigid members, e.g., formed of a metallic material such as steel or aluminum. The latch links 124 may be stamped, forged, or formed in any other method that is convenient. As will be described in further detail below, the actuators 122a, 122b are directly connected to the latch links 124 of the latches 118a, 118b, 118c, 118d, 118e, and 118f in the front panel 106a, while the actuators 122c, 122d each utilize an indirect connection to the latch links 124 of the latches 118g, 118h, 118i, 118j, 118k, 118l, 118m, and 118n. As will be seen, the links 124 may be connected, secured, or linked to other components of the panels 106 in any manner that is convenient in view of the illustrations herein.

Turning now to FIG. 2C, movement of the latches 118 by the actuators 122 is illustrated in further detail. FIG. 2C is an enlarged portion of FIG. 2A and includes actuators 122b and 122c. It should be understood that the actuators 122a and 122b of the front panel 106a are similar with respect to the operation of their respective latches 118, and thus the following description of actuator 122b as illustrated in FIG. 2C is generally applicable to actuator 122a. Similarly, the actuators 122c and 122d of the middle panel 106b and rear panel 106c, respectively, are similar with respect to the operation of their respective latches 118, and as such the description following in reference to FIG. 2C of actuator 122c is generally applicable to actuator 122d.

With continuing reference to FIG. 2C, the operation of actuator 122b and associated latches 118d, 118e, and 118f will be described in further detail. Each of the latches 118d, 118e, and 118f are pivotally connected to a first end 126 of a respective latch link 124, e.g., by way of a pivot pin 127. A second end 128 of each of the latch links 124 is pivotally connected to the actuator 122b, e.g., by a similar pivot pin (not shown) extending through the second end 128. Rotation of the actuator 122b in a counterclockwise direction pulls each of the latch links 124 connected to the actuator 122b, in turn pulling latches 118d, 118e, and 118f away from the extended position seen in FIG. 2C. Continued rotation of the actuator 122b in a counterclockwise direction eventually brings the latches 118d, 118e, and 118f to the withdrawn/disengaged position seen in FIG. 2B. Subsequent rotation of the actuator 122b in a clockwise direction may simultaneously push each of the associated latch links 124 in an opposite direction, thereby driving latches 118d, 118e, and 118f back toward the extended/engaged position illustrated in FIGS. 2A and 2C. As noted above, the latch links 124 may generally be rigid members, which may be convenient for efficiently transmitting pushing/pulling forces (caused by rotation of the actuator 122b) to the latches 118d, 118e, and 118f. Nevertheless, other example arrangements may employ non-rigid members or other connections between the actuators 122 and latches 118.

In contrast to the direct connection of the actuators 122a and 122b described above, the actuators 122c and 122d may generally utilize an indirect connection to the latch links 124 associated with their respective latches 118g, 118h, 118i, 118j, 118k, 118l, 118m, and 118n. More specifically, as seen in FIGS. 2A and 2B, the actuators 122c and 122d are linked indirectly to the latch links 124 by way of intermediate links 130a, 130b, 130c, and 130d (collectively, 130) and intermediate rotary members 132a, 132b, 132c, and 132d (collectively, 132). The intermediate links 130 may be rigid members, and may be similar in construction/materials to the latch links 124. The intermediate rotary members 132 may each be fixed about an axis generally perpendicular to the panels 106 and/or bodies 116 for rotation. The actuator 122c is pivotally linked to intermediate links 130a and 130b, which extend in generally opposing lateral directions away from the actuator 122c. The intermediate links 130a and 130b are each pivotally linked to respective intermediate rotary members 132a and 132b at ends of the intermediate links 130 opposite the actuator 122c. The intermediate rotary members 132a and 132b each are pivotally connected to two latch links 124, e.g., by way of a pivot pin. More specifically, the intermediate rotary member 132a is pivotally connected to the latches 118g and 118h, and the intermediate rotary member 132b is pivotally connected to the latches 118i and 118j.

Rotation of the actuator 122c in a counter-clockwise direction may generally push the intermediate links 130a and 130b toward the intermediate rotary members 132a and 132b, which in turn imparts a clockwise motion/torque to intermediate rotary member 132a, and a counter-clockwise motion/torque to intermediate rotary member 132b. The intermediate rotary members 132a and 132b thus impart a pulling force on each of the latches 118g, 118h, 118i, and 118j by way of the associated latch links 124, moving each away from their extended/engaged position. Sufficient rotation of the actuator 122c, accordingly, brings each of the latches 118g, 118h, 118i, and 118j to the withdrawn/disengaged position illustrated in FIG. 2B. Subsequent rotation of the actuator 122c in the opposite (clockwise as seen in FIGS. 2A-2C) direction causes the latch links 124 to slide the latches 118g, 118h, 118i, and 118j back toward their extended/engaged positions. Accordingly, the actuator 122c may simultaneously impart movement to a plurality of the latches 118 to allow for engagement/disengagement of the latches 118 with an adjacent structure.

The foregoing description of actuator 122c, as noted above, is generally applicable to actuator 122d inasmuch as the actuator 122d imparts sliding movement to four separate latches 118k, 118l, 118m, and 118n by way of two intermediate links 130c and 130d pivotally linked to respective intermediate rotary members 132c and 132d, which are in turn pivotally linked to the latch links 124 of the latches 118k, 118l, 118m, and 118n.

As noted above, each of the latches 118 may be slidably retained within respective latch sleeves 120 fixed to one of the panel bodies 116a, 116b, 116c. Turning now to FIG. 3, an example latch sleeve 120 is illustrated in further detail. The latch sleeve 120 may generally define a travel slot 138 receiving a latch pin 140 of the latch 118 received therein. The latch pin 140 may be formed as part of the latch 118, e.g., in an injection molding or process. The travel slot 138 may generally delimit movement of the latch 118 between the withdrawn position and the extended position. Additionally, the abutment of the latch pin 140 against either end of the travel slot 138 may provide a relatively firm or "hard stop" against further movement of the latch 118. This may prevent over-extension of the latch 118 in either direction. Additionally, contact of the latch pin 140 against either end of the travel slot 138 may provide tactile feedback to the user through the actuator 122, thereby indicating that the associated latches 118 are fully engaged or withdrawn.

Generally, the latches 118 each extend beyond an envelope of their associate panel 106 to engage vehicle structure 120 and/or another adjacent panel 106. In the example illustrated herein, removal of the panels 106 from the vehicle may generally be permitted in a defined sequence when the latches 118 are in the withdrawn position.

More specifically, as best seen in FIG. 2B, in their respective withdrawn positions, the latches 118a, 118b, 118c, 118d, 118e, and 118f are contained within an outer installation periphery 142a of the panel body 106a. Accordingly, the panel 106a is generally freely removable from an opening cooperatively defined by the vehicle structure 102 and the adjacent panel 106b. The latches 118g, 118h, 118i, and 118j are similarly contained within an outer installation periphery 142b of the panel body 106b when drawn into their respective withdrawn/disengaged positions, and the latches 118k, 118l, 118m, and 118n are also contained within an outer installation periphery 142c of the panel body 106c when withdrawn/disengaged.

The panels 106 may include features to prevent removal from the vehicle structure 102 except when removed in a defined sequence. For example, as best seen in FIGS. 1A, 1B, and 2C, a forward edge 143a of panel 106b may rest vertically beneath a rearward edge (not seen in FIG. 2C) of the panel 106a when the panels are installed together onto the roof structure 102. Accordingly, panel 106a generally must be removed from the path of the panel 106b to allow removal of the panel 106b. Similarly, even with all of the latches 118k, 118l, 118m, and 118n of the rear panel 106c in their respective withdrawn/disengaged positions, a forward edge 143b (see FIG. 1A) of the panel 106c may generally rest beneath a rearward edge (not seen in FIG. 2C) of panel 106b when the panels 106 are installed together onto the roof structure 102. As such, panel 106b must be removed from the path of the panel 106c to allow removal of the panel 106c. In this manner, removal of the panels 106b and 106c is generally prevented unless panel 106a is removed (with respect to panel 106b), and panel 106b is removed (with respect to panel 106c).

The opening 104 of the vehicle structure 102, as noted above in regard to FIGS. 1A-1D, may generally be rectangular, with generally rectangularly shaped panels 106a, 106b, and 106c being received therein to close the opening 104. It should be noted that during installation of the three panels 106 to the opening 104, the first panel installed, i.e., panel 106c, engages latches 118l and 118n with a rearward edge of the opening 104, while also engaging the opposing lateral sides of the opening 104 with latch 118k and 118m, respectively. The second panel installed, i.e., panel 106b, engages latches 118h and 118j with the panel 106c, and engages latches 118g and 118i with the opposing lateral sides of the opening 104, respectively. Lastly, the forwardmost panel 106a is installed, engaging a forward edge of the opening 104 with latches 118a and 118d, the panel 106b with latches 118c and 118f, and the opposing lateral sides of the opening 104 with latch 118b and 118e, respectively. The forwardmost panel 106a, as it employs a total of six (6) latches 118, uses multiple actuators 122, thereby reducing force required to engage the six latches 118. Furthermore, the provision of multiple latches on the forward panel 106a provides a redundancy that prevents removal of panel 106a unless actuator 122a and actuator 122b are both turned to disengage their respective latches 118. In other words, movement of a single actuator 122a or 122b will not enable the panel 106a to be removed (e.g., while driving). Accordingly, removal of any one of the panels 106 requires at least two actuators 122 to be moved in such a manner as to completely open their respective latches 118.

It should also be noted that while the example approaches herein employ three panels 106a, 106b, and 106c, any number of panels 106 may be employed that is convenient (e.g., 2, 3, 4, 5, etc.). Moreover, the generally rectangular shape of the panels 106 and opening 104 is merely illustrative, and other shapes or configurations may be employed.

The vehicle structure 102, panel 106b, and panel 106c may have pockets, cavities, or other features for receiving latches 118 of an adjacent panel 106. For example, latches 118 may be received about a perimeter of the vehicle structure 102 in pockets 144, examples of which are best seen in FIG. 2C. More specifically, latches 118d and 118e of the panel 106a, as well as latch 118i of panel 106b, engage vehicle structure 102 in respective pockets 144a, 144b, and 144c. Additionally, the latches 118c and 118f of the front panel 106a may be received in a panel pocket 146a of the panel 106b. Similarly, the latch 118j of panel 106b extends into a panel pocket 146b of panel 106c. Each of the pockets 144 and panel pockets 146 may generally define a volume for receiving a respective latch 118.

While not illustrated in the enlarged FIG. 2C, the vehicle structure 102 may define similar pockets 144 for receiving latches 118a and 118b of panel 106a, latch 118g of panel 106b, and latches 118k, 118l, 118m, and 118n of panel 106c. Additionally, the panels 106b and 106c may each include an additional panel pocket 146 for receiving the latch 118c of panel 106a, and latch 118h of panel 106b, respectively.

Figure 4:
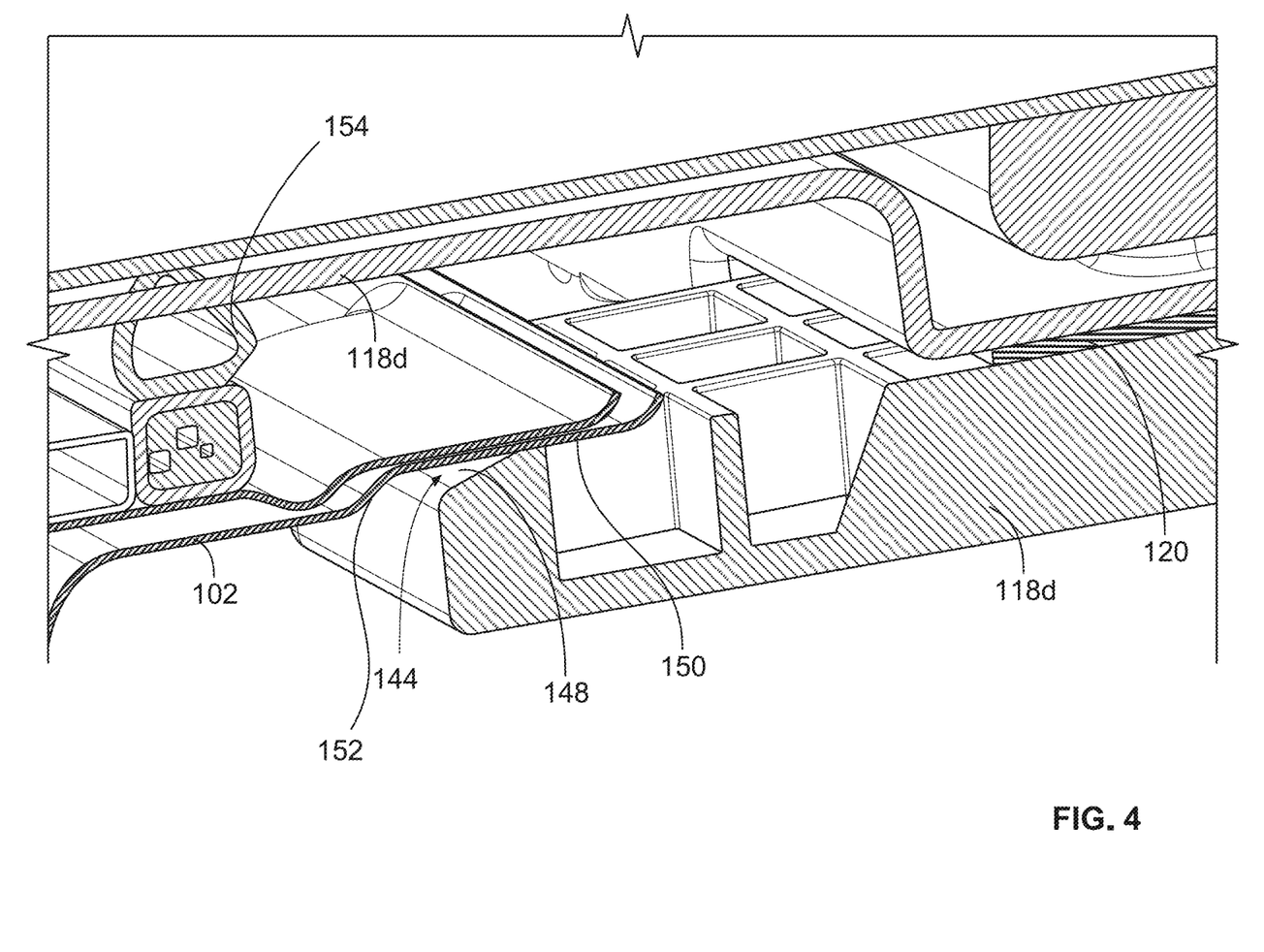
FIG. 4 shows an enlarged lower/interior perspective view of a portion of the roof system of FIGS. 1A-3, in accordance with an example.

The latches 118 may generally cooperate with their respective pocket 144 or panel pocket 146 to facilitate a smooth and/or consistent engagement/disengagement of the latch 118. Turning now to FIG. 4, the engagement of latch 118d to the pocket 144 of the vehicle structure 102 is illustrated in further detail. The latch 118 is generally housed within the sleeve 120, with a free end of the latch 118 received in the pocket 144. Latch 118d is illustrated with an engagement ramp 148, which seats against a planar surface 150 defined by the pocket 144. An angle of the engagement ramp 148 relative to the planar surface 150 may be determined based upon a desired resistance provided by friction between the engagement ramp 148 and planar surface 150 as the latch 118 is inserted/removed from the pocket 144. As seen in FIG. 4, a second planar surface 152 positioned relatively deeper into the pocket 144 than the planar surface 150 may provide relatively increased insertion resistance against the engagement ramp 148 in comparison to the planar surface 150, such that resistance to insertion of the latch 118 increases as the latch 118 approaches a maximum insertion into the pocket 144. The planar surfaces 150 and/or 152 may thereby enhance the degree to which a user may perceive the latch 118 to be fully engaged or closed as they move latches 118 via the actuator 122.

Additionally, a gasket 154 is illustrated in FIG. 4 that is positioned between the panel 106 and the adjacent vehicle structure 102 (or, for that matter, an adjacent panel 106). The gasket 154 may be relatively resilient, such that it is compressed or deflected to increase sealing between adjacent panels 106 or vehicle structure 102. For example, as illustrated in FIG. 4, as the latch 118 travels deeper into the pocket 144 the gasket 154 may be relatively compressed between the panel 106 and an adjacent panel or adjacent vehicle structure 102. More specifically, the engagement ramp 148 of the latch 118 may deflect planar surface 150 and/or planar surface 152 vertically upwards as illustrated in FIG. 4, thereby deflecting the gasket 154. The compression of the gasket 154 may increase sealing between the adjacent panels 106 and/or vehicle structure 102, thereby increasing the degree to which the joint between a panel 106 and an adjacent panel 106 or adjacent vehicle structure 102 prevents intrusion of water, air, or the like.

The example illustrations herein generally provide a removable panel that securely attaches to a structure, e.g., of a vehicle, while still allowing relatively easy removal/installation via a single rotatable actuator.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A removable panel, comprising:
a panel body configured to cover an opening defined by a structure;
a plurality of latches, the latches each positioned adjacent a respective edge of the body and configured to translate linearly from an open position to a closed position;
an actuator fixed to the panel for rotation about an actuator axis; and
a plurality of latch links, each latch link having a first end connected to a corresponding one of the latches, each latch link having a second end operably linked with the actuator such that rotation of the actuator simultaneously drives each of the latch links;
wherein rotation of the actuator in a first rotational direction drives each of the latches from the open position of the latch to the closed position of the latch, and rotation of the actuator in a second rotational direction opposite the first rotational direction drives each of the latches from the closed position of the latch to the open position of the latch;
wherein the second end of at least one of the latch links is pivotally connected to the actuator.

2. The removable panel of claim 1, wherein the latch links are rigid members.

3. The removable panel of claim 1, wherein the latches are configured to engage one of the structure or an adjacent removable panel in the closed position, thereby securing the panel body to the structure.

4. The removable panel of claim 1, wherein the latches are contained within an outer installation periphery of the panel body in the open position, such that the panel body is removable from the structure.

5. The removable panel of claim 1, wherein the latches are each slidably retained within a latch sleeve fixed to the panel body.

6. The removable panel of claim 1, wherein one or more of the latches define an engagement ramp positioned to change an insertion resistance of the latch during movement from the open position to the closed position.

7. The removable panel of claim 1, wherein the opening defined by the structure is a vehicle roof opening.

8. The removable panel of claim 1, wherein the latches each translate without rotational motion from the open position to the closed position.

9. The removable panel, comprising:
a panel body configured to cover an opening defined by a structure;
a plurality of latches, the latches each positioned adjacent a respective edge of the body and configured to translate linearly from an open position to a closed position;
an actuator fixed to the panel for rotation about an actuator axis; and
a plurality of latch links, each latch link having a first end connected to a corresponding one of the latches, each latch link having a second end operably linked with the actuator such that rotation of the actuator simultaneously drives each of the latch links;
wherein rotation of the actuator in a first rotational direction drives each of the latches from the open position of the latch to the closed position of the latch, and rotation of the actuator in a second rotational direction opposite the first rotational direction drives each of the latches from the closed position of the latch to the open position of the latch;

wherein the second end of at least one of the latch links is secured to an intermediate rotary member fixed to the panel body for rotation about an intermediate rotary member axis.

10. The removable panel of claim 9, further comprising an intermediate link having a first end and a second end, the intermediate link first end connected to the intermediate rotary member, the intermediate link second end connected to the actuator, such that rotation of the actuator rotates the intermediate rotary member.

11. The removable panel of claim 10, further comprising at least one additional intermediate link and at least one additional intermediate rotary member, wherein the actuator is linked via multiple intermediate links to multiple intermediate rotary members corresponding to each of the intermediate links.

12. The removable panel of claim 11, wherein each of the intermediate rotary members are linked via at least two of the plurality of the latch links to their corresponding latches.

13. The removable panel of claim 9, wherein the latch links are rigid members.

14. The removable panel of claim 9, wherein the latches are each slidably retained within a latch sleeve fixed to the panel body.

15. The removable panel of claim 9, wherein one or more of the latches define an engagement ramp positioned to change an insertion resistance of the latch during movement from the open position to the closed position.

16. The removable panel of claim 9, wherein the latches each translate without rotational motion from the open position to the closed position.

17. A removable vehicle roof panel, comprising:
a panel body configured to cover a roof opening defined by a vehicle structure;
a plurality of latches, the latches each positioned adjacent a respective edge of the body and configured to translate linearly from an open position to a closed position, wherein the latches are configured to engage one of the structure or an adjacent removable panel in the closed position, thereby securing the panel body to the structure, wherein the latches are contained within an outer installation periphery of the panel body in the open position, such that the panel body is removable from the structure;
an actuator fixed to the panel for rotation about an actuator axis; and
a plurality of latch links, each latch link including a rigid member having a first end connected to a corresponding one of the latches, each latch link having a second end operably linked with the actuator such that rotation of the actuator simultaneously drives each of the latch links;
wherein rotation of the actuator in a first rotational direction drives each of the latches from the open position of the latch to the closed position of the latch, and rotation of the actuator in a second rotational direction opposite the first rotational direction drives each of the latches from the closed position of the latch to the open position of the latch;
wherein the second end of at least one of the latch links is secured to the actuator.

18. A removable vehicle roof panel, comprising:
a panel body configured to cover a roof opening defined by a vehicle structure;
a plurality of latches, the latches each positioned adjacent a respective edge of the body and configured to translate linearly from an open position to a closed position, wherein the latches are configured to engage one of the structure or an adjacent removable panel in the closed position, thereby securing the panel body to the structure, wherein the latches are contained within an outer installation periphery of the panel body in the open position, such that the panel body is removable from the structure;
an actuator fixed to the panel for rotation about an actuator axis; and
a plurality of latch links, each latch link including a rigid member having a first end connected to a corresponding one of the latches, each latch link having a second end operably linked with the actuator such that rotation of the actuator simultaneously drives each of the latch links;
wherein rotation of the actuator in a first rotational direction drives each of the latches from the open position of the latch to the closed position of the latch, and rotation of the actuator in a second rotational direction opposite the first rotational direction drives each of the latches from the closed position of the latch to the open position of the latch;
wherein the second end of at least one of the latch links is secured to an intermediate rotary member fixed to the panel body for rotation about an intermediate rotary member axis.

19. The removable vehicle roof panel of claim 18, further comprising an intermediate link having a first end and a second end, the intermediate link first end connected to the intermediate rotary member, the intermediate link second end connected to the actuator, such that rotation of the actuator rotates the intermediate rotary member.

20. The removable vehicle roof panel of claim 19, further comprising at least one additional intermediate link and at least one additional intermediate rotary member, wherein the actuator is linked via multiple intermediate links to multiple intermediate rotary members corresponding to each of the intermediate links.

* * * * *